United States Patent [19]

Zimmer et al.

[11] 4,072,093

[45] Feb. 7, 1978

[54] ROTARY FOOD OVEN

[75] Inventors: Elvis Simon Zimmer, Cedar; David Allen Hassell, Coon Rapids, both of Minn.

[73] Assignee: Jeno F. Paulucci, Duluth, Minn.

[21] Appl. No.: 672,849

[22] Filed: Apr. 2, 1976

[51] Int. Cl.$^2$ .............................................. A47J 37/06
[52] U.S. Cl. ..................................... 99/443 R; 99/365; 219/388
[58] Field of Search .......................... 99/365, 339–340, 99/341, 360, 362, 443 R, 443 C, 448; 126/338; 221/21; 219/388

[56] References Cited

U.S. PATENT DOCUMENTS

| Re. 20,530 | 10/1937 | Walker | 99/365 X |
|---|---|---|---|
| 1,085,852 | 2/1914 | Duncan | 99/360 X |
| 2,651,435 | 9/1953 | Stahmer | 221/21 |
| 3,435,754 | 4/1969 | Lohr et al. | 99/341 |
| 3,601,037 | 8/1971 | Giaretta | 99/443 C |
| 3,847,069 | 11/1974 | Guibert | 99/443 R |

Primary Examiner—Leonard D. Christian
Assistant Examiner—Arthur O. Henderson
Attorney, Agent, or Firm—Henry C. Kovar

[57] ABSTRACT

A rotary food oven includes a heatable oven chamber, an annular trackway of helical form inside of the chamber and a rotatable reel for advancing food packages around the trackway, the trackway is formed of a disc of sheet metal having perforations for radiant and convective passage of heat and is of a simplified construction, the reel has drive rods rotatable about a circular path and about their own axis for imparting epicyclic movement of circular food packages around the trackway, and the reel and trackway are removable from the oven chamber for cleaning and service.

41 Claims, 7 Drawing Figures

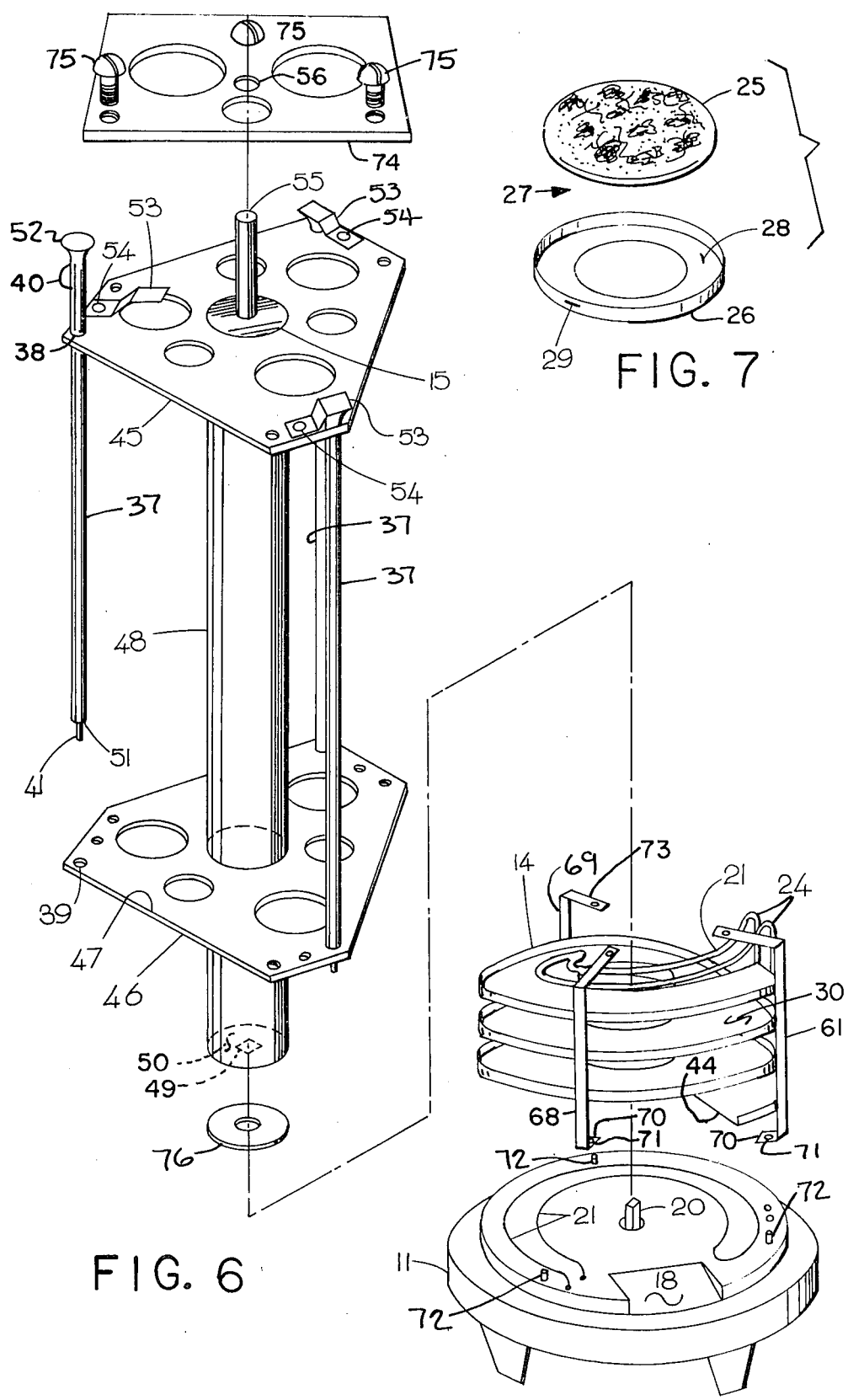

ROTARY FOOD OVEN

BACKGROUND OF THE INVENTION

1. Field of the Invention

This invention pertains to a food oven having an annular trackway and a drive reel for advancing food packages around the trackway, to a construction of a trackway, and to a construction of a drive reel.

2. Prior Art

Hot food articles, such as pizzas, are frequently prepared at the place of consumption, and the article may be sized to constitute a single serving. It has been found that in attempting to bake such articles rapidly, there is a tendency for the baking to be uneven. This problem is heightened by the fact that the same equipment will typically be used for baking a pizza that begins in the frozen state as well as one that begins in the unfrozen state, and of course, the degree of freezing can vary from point to point on a particular pizza, thereby causing uneven rising, uneven baking and uneven browning, and in some instances even causing burning before the article is ready for consumption. There can be superficial overcooking with inadequate rising of dough. To resolve such problem, in the past, a separate oven has been utilized to thaw the dough before baking, and such an arrangement becomes durdensome in that the operator needs to use two ovens, needs to have multiple opening and closing of doors, and is placed at a disadvantage in needing to estimate baking time.

A concept for solution to the foregoing uneven heating problem is provided by the oven of Raul Guibert U.S. Pat. No. 3,847,069. This oven has a vertical axis helical track of several levels with electric heating elements in between the track levels and a reel for advancing circular food packages down the track and past the heating elements.

An important feature of U.S. Pat. No. 3,847,069 is the provision of epicyclic movement of a food package to give even heating of the food.

However, the structure of the oven of U.S. Pat. No. 3,847,069 has been found too expensive for commercial usage and further has been found relatively difficult to build, assemble and clean. It will be appreciated that any food oven is subject to spattering and collection of grease, spillage and cooking residue; and that such a food oven must be cleanable and must be periodically cleaned in the public interest. It has further been found that this prior art oven was susceptible to frequent jamming, the consequence of which is burned food and the accompanying smoke from the burning food and consequential dirting of the interior of the oven.

SUMMARY OF THE INVENTION

According to this invention, a rotary food oven is provided with a heating chamber in which there is an annular trackway for supporting food packages to heated, and a rotatable reel is provided for advancing the packages around the trackway; distinct aspects of the invention include provision in the oven of a rotatable package drive rod mounted in the reel for rotating about its own axis enabling epicyclic movement of the package, a trackway having a rough upright rim for mechanically engaging a food package and effecting epicyclic movement, and a trackway, reel, and reel bearing which are removable from the oven chamber structure; further aspects of the invention include a construction of a helical annular trackway formed of discs of sheet metal, and a construction of a drive reel having rotatable drive rods.

Accordingly, it is an object of the present invention to provide a simplified construction of an oven which will cause food packages to be rotated during heating for obtaining even heating thereof.

A further object of the present invention is to provide a rotary oven having a reel for advancing a food package through an epicyclic motion as the package is heated.

A still further object of the present invention is to provide a rotary food oven having a rack which will rotate a food package through an epicyclic motion as the package is heated.

Yet another object of the present invention is to provide an oven which will rotate food packages and will not jam up.

Another object of the present invention is to provide a rotary food oven which has a construction which complies with sanitation codes and is easily disassembled for cleaning.

Another important object of the present invention is a construction of an annular helical rack which is economical.

Another important object of the present invention is the provision of an economical drive reel construction.

A further object of the present invention is the provision of an economical structure for unloading food packages from a rotary oven.

A most important object of the present invention is the provision of an oven which can operate at very high heating temperatures and be of a construction economically modest and competitive in both initial cost and in energy requirement and consumption to be commercially marketable and preferable.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example.

ON THE DRAWINGS

FIG. 6 is an exploded perspective view of the oven of FIG. 1; and

FIG. 7 is a perspective view of a food page for use in and with the oven of FIG. 1.

AS SHOWN ON THE DRAWINGS

Figure 1:
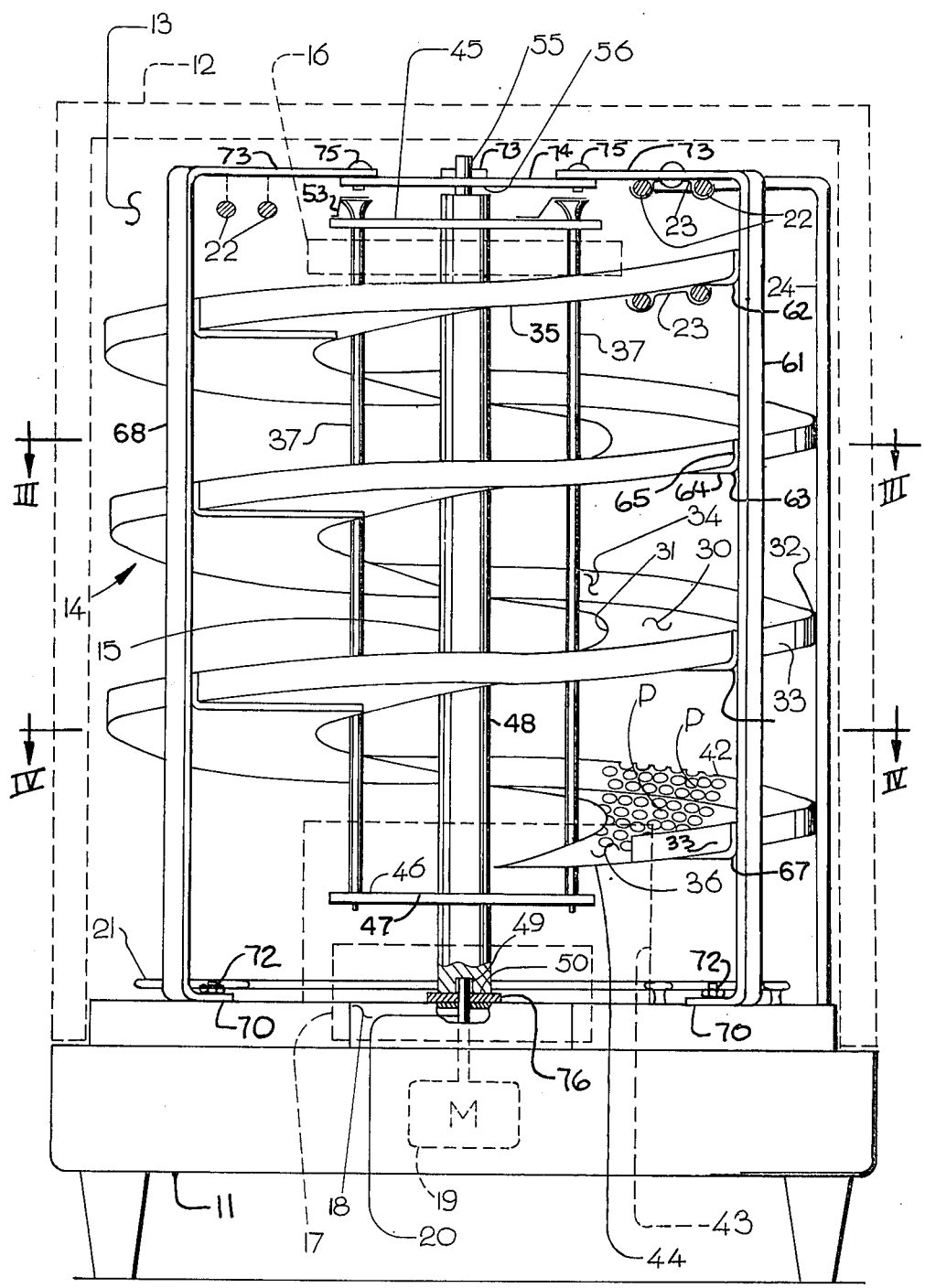
FIG. 1 is a front elevational view of the oven of the present invention with part of the oven cabinet being shown in dotted line.

The principles of the present invention are particularly useful when embodied in a food oven of the type illustrated in FIG. 1 and generally indicated by the numeral 10. The oven 10 includes an insulated base 11, an insulated cover 12 which together with the base 11 forms an oven chamber 13, and an annular trackway 14 for supporting food packages and a drive reel 15 which is rotatable for advancing food packages around the trackway 14.

The cabinet of the oven 10 is formed jointly by the base 11 and the insulated cover 12 which sits upon the base 11 and is liftable upward for removal from the base 11 giving access to the trackway 14 and reel 15 as shown in FIG. 1. The cover 12 has an inlet 16 through which food items may be placed on the trackway 14, and an outlet 17 through which a heated food item may be discharged out of the oven chamber 13. The base 11 has a downward sloping outlet chute 18 leading from the trackway 14 into the outlet 17. The base 11 also includes a motor 19 having a rotary drive or output shaft 20 for connection to and driving of the reel 15. There is a heating element 21 mounted on the base 11. The heating element 21 is of a C-shape and extends around the bottom of the oven chamber 13 underneath the trackway 14 and provides part of the heating of the oven chamber 13. There is also a top heater element 22 mounted on the trackway 14. The top heater 22 is formed into a circular shape and extends around the top of the trackway 14. The top heater 22 is fastened to the trackway with clips 23 and has a connector lead 24 running from the top of the trackway 14 to the base 11 where it is connected to a source of electric power. The entire trackway 14 is illustrated as being of sheet metal but the entire trackway 14 is perforated and is relatively open, an example of the perforations is shown at "P." The trackway 14 has perforations in the range of forty to sixty percent of the area of the trackway 14 and with these perforated openings, hot air and radiant heat are applicable throughout the height of the trackway 14.

An important feature of this invention is the cooperative structure in the trackway 14 and reel 15 for advancing a food package along the trackway 14 in an epicyclic movement.

A particularly useful food package in the oven of FIG. 1 is illustrated in FIG. 7. The food item 25 which maybe a pizza, tostado, eggs, cheese sandwich, hash browns, fruit or pot pie or the like is placed in a rigid tray 26 forming a food package 27. The tray 26 has a bottom 28 which may be either closed or open and a round cylindrical rim 29 for retaining the food 25 upon the bottom 28. The food package 27 is sized to go in oven inlet 16, to fit on trackway 14 and to come out of the oven outlet 17. The package 27 is also particularly suited to be rotated about its own axis as it is advanced around the trackway 14 for even heating of the food item 25 as will be explained.

The trackway 14 is of an annular configuration and for some aspects of this invention could be just a flat round disc (not shown). Other aspects of the invention include that the trackway 14 be helical as shown but it is believed that part of the invention requires only a single level of helical trackway whereas the oven 10 of FIG. 1 has a three plus level or revolution helical trackway 14.

Figure 3:
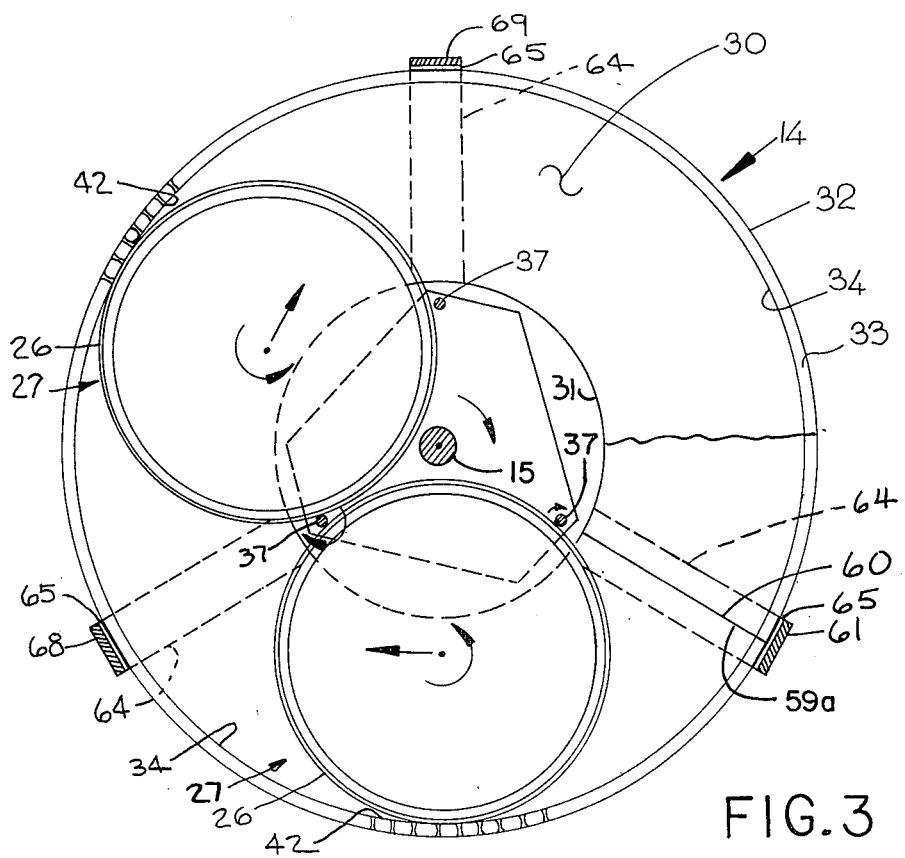
FIG. 3 is a top sectional view taken through lines III—III of FIG. 1.

The trackway 14 has an annular support surface 30 for supporting a food package 27. The support surface 30, as seen from above, has a circular inner edge 31 and a circular outer edge 32 which have a true shape of a helix if the trackway 14 is helical. The support surface has an upright cylindrical rim 33 on one of the circular edges 31 or 32 and in the preferred embodiment illustrated, the rim 33 is on the outer circular edge 32. This rim 33 also has a helical true shape but it is circular when seen from the top of trackway 14. The cylindrical surface 34 of rim 33 faces toward the annular support surface 30 for engaging a food package 27 and retaining the package upon the surface 30. The trackway has a loading end 35 at which a food package 27 first contacts the trackway 14 upon loading of the package 27 into the oven chamber 13. The trackway also has an unloading end 36 off which a food package 27 is dropped as the package 27 completes a path of travel over the trackway 14. The unloading end 36 is positioned to drop a food package 27 onto the outlet chute 18. Each of the trackway ends 35 and 36 may be a radial end of the trackway 14. When a food package such as that shown in FIG. 7 is placed upon the support surface 30, as is shown in FIG. 3, the package 27 is positioned on the support surface 30 and overhangs off the support surface 30. If the track rim 33 is on the outside circular edge 32 of the surface 30, the package 27 will overhang to the inside of the surface 30 and if the track rim 33 is on the inside circular edge 31 of the surface 30, the package 27 will overhang to the outside of surface 30.

The drive reel 15, which is mounted co-axially with the trackway 14, is rotatable about the axis of trackway 14 when driven by the motor 19. The reel 15 has drive members 37 which co-rotate with the reel 15 and which revolve through a circular path adjacent to the support surface edge 31 over which a food package 27 would hang. Were the food package 27 to overhang the outer edge 32 of the support surface 30, as has previously been explained to be practicable, the drive members 37 would revolve through a circular path adjacent to the outer edge 32. As is best illustrated in FIG. 3, the drive members 37 will engage the overhanging portion of the food package 27 and wedge the package 27 against the surface 34 of the track rim 33. The track rim surface 34 is relatively rough, as compared to the surface of the drive member 37 and the surface 34 will frictionally engage the food package 27 and cause it to rotate about its own axis in an epicyclic movement as is shown. It will be apparent the outer edge of the food package 27 will have to move with respect to the surface of the drive member 37 and to minimize the friction there between, the drive member 37, which is metal, is covered with an anti or low friction coating. The preferred coating is graphite. This coating further exaggerates the difference in the surfaces of the track rim surface 34 and the surface of the drive member 37. The coefficient of friction between a food package 37 and the track rim surface 34 is vastly higher than between a food package 27 and drive member 37 and so the food package is moved in an epicyclic movement as is illustrated in FIG. 3. When the trackway 14 is in the form of a helix as shown in FIG. 1, the drive member 37 is preferably an elongate round rod of at least the height of the helical trackway 14. The continual round surface of such a drive member rod 37 also helps to minimize the friction between itself and a food package 27. A further feature of the reel 15 and the drive member is illustrated in FIG. 6. The reel 15 has an upper bearing 38 and a lower bearing 39 in which the drive member 37 is rotatably mounted. The drive member 37 has an upper journal 40 and a lower journal 41, each of which is within and is in engagement with a respective bearing 38 or 39. The drive member 37 is free to rotate about its own axis as illustrated in FIG. 3, which further reduces friction between a food package 27 and the drive member 37. The entire length and therefore the entire exterior surface of drive member 37 is coated with a low friction coating and the low friction coating forms the surface of each journal 40,41 which engage the bearings 38,39.

Continual rotation of the drive member 37 provides that the contact point of low friction coating against a food package 27 is constantly being changed which contributes to an extended service life for a drive rod 37. Another feature which helps to move the food package 27 in an epicyclic movement is the perforated edge 42, shown in FIG. 5, on the top of the track rim 33. This perforated edge 42 continually and almost mechanically engages a food package 27 as the package is advanced around the trackway 14.

In operation of the oven 10, the reel 15 is continually rotating. A food package 27 is placed into the oven chamber 13 through the inlet 16 and over the top of the track rim 33 and onto the loading end 35 of trackway 14. The food package rests upon the support surface 30 and as the reel 15 rotates, one of the drive members 37 will engage the package 27 and push the package 27 against the track rim 33. The package 27 will frictionally engage either, and preferably both of the rim surface 34 and the perforated edge 42. The package 27 will then be advanced in an epicyclic movement on and around the trackway 14 during which movement the package 27 will turn past the drive member 37 which may turn about itself as well as revolve with the reel 15. During advancement of the package 27 around the trackway 14, the food item 25 will be exposed to radiant and convective heat from heaters 21 and 22; some of this heat will be transferred around the trackway 14 and some will be passed through the perforations. The epicyclic movement of the food package 27 serves to continually rotate the food item atop of and along the length of the preforated support surface 30 and under and over the heaters 21 and 22 and through the hot air within the oven chamber 13. After the food package 27 has been advanced around, and down the entire trackway 14 and the food item 25 has been cooked, the package 27 is pushed off of the unloading end 36 of trackway 14 by the drive member 37. The package 27 then falls onto the outlet chute 18 and goes through the outlet 17 and comes out of the oven chamber 13. The cooked food item 25 is then ready for consumption and has been very evenly heated and cooked.

Figure 4:
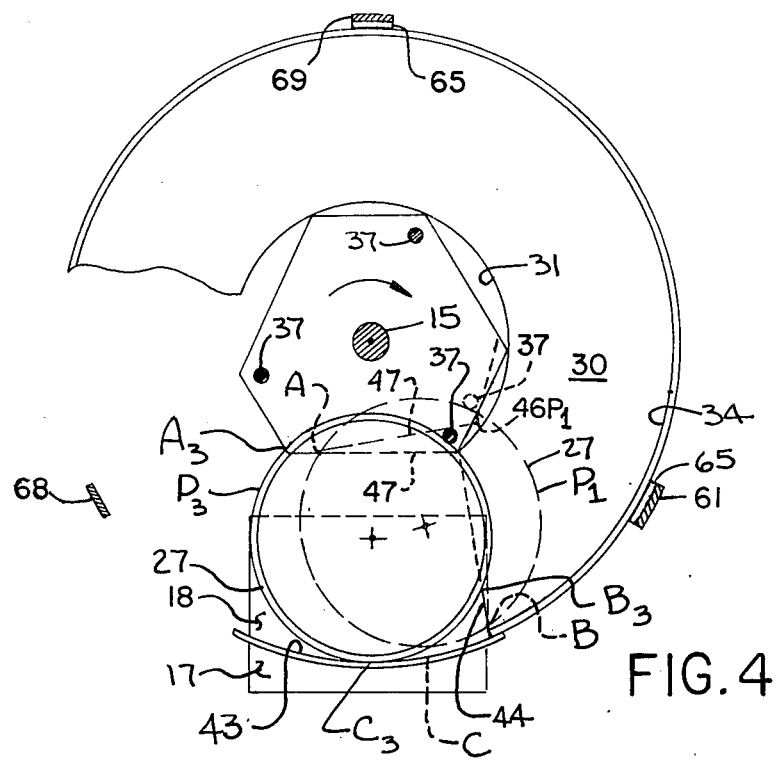
FIG. 4 is a top sectional view taken through lines IV—IV of FIG. 1.

Another important feature of this invention is the unloading end 36 of trackway 14 together with internal drive reel 15 for discharging or unloading a food package 27 off from the trackway support surface 30 and onto the outlet chute 18 without jamming up. There is an upright barrier 43 extending from the unloading end 36 of trackway 14 and the barrier 43 effectively extends the track rim 33 past the edge 44 of the unloading end 36 a distance, or radial amount at least equal to half of the diameter of a food package such as 27 and preferably an amount of about the package 27 diameter. The outlet 17 goes right under the barrier 43, the elevation of which outlet 17 can be seen in dotted lines in FIG. 1 as can the elevation of a drive reel top spider 45 and bottom spider 46. The bottom spider 46 is positioned at a level lower than the level of the unloading end 36 and has support edge 47, as seen in FIG. 4 for partially supporting a food package 27. The barrier 43 covers the same elevational level as the end of the track rim 33 and is formed on a radius from the axis of the trackway 14 as is the track rim 33. The end edge 44 of the unloading end 36, lies on a line, which if extended inward, would pass between the inner edge 31 and the axis or vertical centerline of the trackway 14.

There is a three positional physical geometry formed between the drive member 37, the trackway 14, the spider 46 and the barrier 43 which is seen in FIG. 4 together with the food package 27. As the package 27 is pushed off the unloading end 36, a first position of package 27 is assumed and shown in dotted line indicated by $P_1$. In this first position $P_1$, the drive member 37 has pushed the package partially off of the unloading end 36 and the center of package 27 has been pushed past the end edge 44. The package 27 has tipped downward off of end edge 44 and is in supporting contact with the bottom spider, as shown in dotted line and indicated by $46P_1$, along the edge 47 at point A. The package 27 when in this first position is stably and jointly supported by the end edge 44 and the contact at point A.

As the reel 15 continues to rotate and the package 27 is further advanced, a second position and geometry is assumed. The package 27 has an outer point of contact with the end edge 44, this point of contact being indicated by B. It must be appreciated that as the package 27 is being pushed off of the unloading end 36, that point B is changing and moving inward on end edge 44. In the first position and geometry, the center of package 27 was behind or to the inside of an imaginary line drawn from point A to point B. In the second position and geometry, the center of the package 27 has been pushed across the line between A and B and the package 27 tips forward about this line and slides forward and comes into a point of frictional contact with the barrier 43, this point of contact is indicated by C. In this second position and geometry the center of the package 27 is within a triangle formed by imaginary lines between points A, B and C. The center of package 27 is close to the line between A and B and the package is unstable and is able to pivot downwardly about the line between A and B. The friction contact at point C is the only thing preventing the package 27 from falling downward.

As the reel 15 continues to rotate, the package 27 is pushed from the second position to a third position shown in solid line and indicated by $P_3$. The second position was not shown but is between illustrated positions $P_1$ and $P_3$. In the third position and geometry, the reel 15, drive member 37 and the package 27 are in the positions shown in solid line with the spider support edge 47 being generally parallel to the barrier 43. In this position the contact points are $A_3$, $B_3$ and $C_3$ respectively and the center of package 27 is still within a triangle formed by lines extending between points $A_3$, $B_3$ and $C_3$ which essentially are the second position points A, B and C which have been advanced. In the third position the center of the package 27 has been moved into the theoretical triangle and away from the line between points $A_3$ and $B_3$ and the movement of the package, about the line between points $A_3$ and $B_3$ and under the force of gravity, is sufficient to overcome the frictional contact at point $C_3$ and the package 27 slides down the barrier 43 and onto the outlet chute 17 and thence down the chute 16, off the end edge 44 and the spider edge 47 and out through the outlet 17. In the third position and geometry, the drive member 37 preceding the package 27 is in a position where it is spaced away from the barrier 43 a distance of less than the diameter of the package 27 so there is no way that the package 27 can overshoot the outlet 17.

It has been found that this geometry, while reasonably complex, works extremely well and is thought to be 100 percent jam-proof. And while the geometry and operation are somewhat complex, the structure is quite simple, economical and easily manufactured.

A further important improvement in the present invention is the drive reel 15, which is best shown in FIG. 6. The reel 15 has an upper spider 45 and a lower spider 46 as previously mentioned and a driveshaft 48 which rigidly connects and spaces apart the spiders 45,46. Each of the spiders 45,46 is a plate of sheet metal which is perforated for convective heat flow. The drive shaft 48 has at its lower end an internal spline 49 which is freely and slidably connectable with the motor output shaft 20, for driving of the spiders 45,46 and the reel driveshaft 48 co-rotatably about their common center. The reel 15 is intended to stand vertically and an annular thrust surface 50 surrounds the spline 49 for supporting the reel 15 in a vertical upright position as shown in FIG. 1. The bearings 38,39 are spaced radially outward from the center axis of the reel 15 and are in alignment with each other for rotatably holding the drive member 37 in a position radially outward of and generally parallel to the axis of the reel 15. The bearing 39 is smaller in diameter than the bearing 38 and the drive member 37 has an annular thrust bearing 51 formed by the annular step between the main body of the round drive member 37 and the reduced diameter journal 41. The annular thrust bearing 51 is also covered by a low-friction coating. The drive member 37 has an expanded shoulder 52 on its top end which prevents the drive member 37 from falling through the bearing 38 if the journal 41 is not correctly put into the bearing 39. There is a retainer 53 mounted to spider 45 for axially retaining a respective drive member 37 in its respective bearings 38,39. The retainer 53 is mounted to the top spider 45 for retaining the drive member 37 in the reel 15 in a direction opposite to the direction of support and retention provided by the drive member thrust bearing 51. The retainer 53 is a "Z" shaped bracket of sheet metal and is held to spider 45 by a rivet 54. The retainer 53 is moveable to an alternate position, as is shown in both FIGS. 2 and 6, enabling removal of the drive member 37 from the reel 15. The reel 15 also has a journal 55 at its upper end which is piloted in a bearing 56 in the top of the trackway 14 for alignment of the reel 15 with the trackway 14.

This particular reel 15 has been found to be economical and operable in a temperature of 1000° F. (540° C.) without distortion that would render the reel 15 inoperable. It should also be mentioned that the spiders 45 and 46 are the same physical part and are merely turned end for end on the reel 15.

Figure 5:
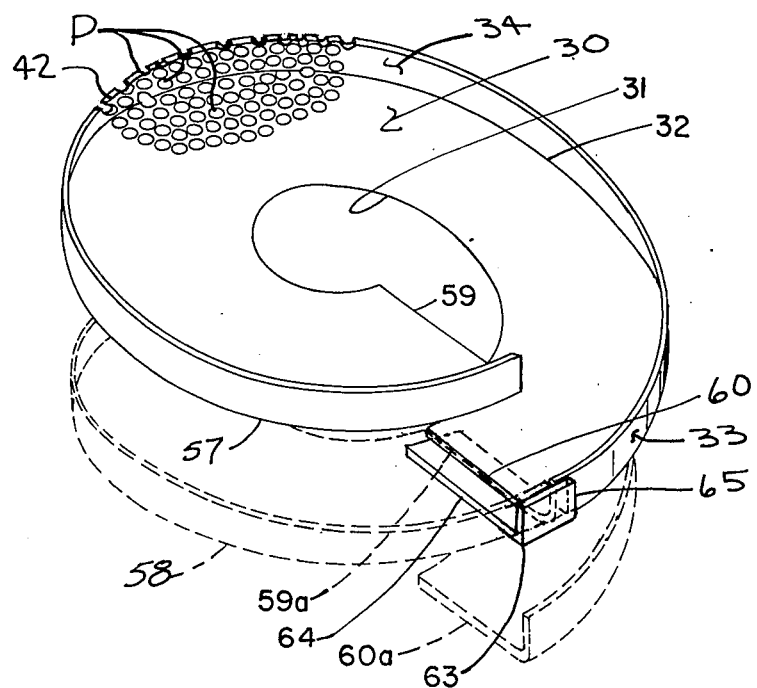
FIG. 5 is a perspective view of the helical track of the oven of FIG. 1.

The trackway 14 is another important improvement in the present invention. The previous helical trackways were made of angle iron or of welded wire configurations. Referring to FIG. 5, a single level 57 or revolution of trackway 14 is shown in solid line and the next lower, or subsequent level 58 is shown in dotted line. A single level 57 is formed from an annulus of flat sheet metal. The annulus is radially split from the inner circular edge 31 to the outer circular edge 32 forming a pair of distinct radial ends 59 and 60 to the level 57. One of the peripheral edges of the flat annulus of sheet metal is formed into a circular flange generally perpendicular to what becomes the support surface 30 forming the track rim 33. For use in a convection oven, the track level 57 is made of perforated sheet metal and a sheet metal having perforations in the area of forty to sixty percent of the area of the metal has been found to give an excellent combination of structural strength, thermal stability and thermal transfer. The cylindrical track rim 33 is formed of the same sheet metal as is the support surface 30 and the track rim 33 is a flange bent up from an edge of the originally flat annulus of sheet metal. The perforate edge 42 is the edge of the perforated sheet metal annulus before the track rim 33 is formed.

The trackway 14 includes a separator 61 as best seen in FIGS. 1 or 6. The separator 61 is a relatively heavy piece of metal strap which is attached to each radial end 59,60 of the rim 33 spacing apart the radial 59,60 one atop the other and defining the vertical pitch of a revolution of the helical trackway level 57. The separator 61 also serves as a support for the trackway 14 and has means for being attached to the base 11.

The separator 61 has parallel support straps 62,63 which extend underneath the support surface 30 and are generally perpendicular to the separator 61. Each support strap 62,63 is attached to a respective end 59,60 and as the support straps 62,63 are much stronger than the sheet metal track level 57, the ends of 59,60 of a track level 57 are held parallel to each other. With this configuration, both the inner circular edge 31 and the outer circular edge 32 have the same helical pitch and any radial line from the axis of the trackway 14 through the support surface 30 will be perpendicular to the axis as well as horizontally level when the trackway 14 is in the oven 10. Each support strap 62,63 is a relatively strong metal strip and is formed in the shape of an "L" with one leg 64 being welded to the bottom of the support surface 30 and the other leg 65 being welded to the rim 33. The rim 33, leg 65 and separator 61 are welded together with the leg 65 between the rim 33 and the separator 61.

The trackway 14 may be multi-level and extend for more than one revolutionary level 57 as shown in FIG. 1 where there are three plus levels. When a multi-level trackway 14 is made, a plurality of single levels 57, all of them being similar and identical, are positioned one above another with radial end 60 against radial end 59a and so on. Support strap 63 overlaps to each side of the line where the radial ends 60 and 59a meet and each of the ends 60 and 59a is welded to the support 63 as is each respective end of the track rim 33. There is a further support strap 66,67 under each successively lower joint between individual trackway levels 57 and each of these is welded together as previously explained. The successive levels of the trackway 14 are spaced from each other by the separator 61 and support straps 62,63,66,67 and form a continual multi-level trackway 14 which has an even helical pitch over its length.

There are second and third separators 68 and 69 welded to and part of the trackway 14. The three separators 61, 68 and 69 are spaced radially around the trackway 14 from each other. Each of the separators 61,68,69 has a respective support strap for each level 57 of track with which a respective separator is in contact.

Each of the separators 61,68,69 has a turned under bottom flange 70 having a fastener aperture 71 through which a fastener 72 in base 11 may pass for securing the trackway 14 to the base 11. The top of each separator 61,68,69 has a top flange 73 turned in towards the axis of the trackway 14, and the bearing 56 for the reel journal 55 is an aperture in a metal plate 74 which mounts on flanges 73. Top heater 21 also mounts, at least in part, on flanges 73.

This trackway 14 has been found to be an extremely practical and effective solution for the economical manufacture of what would otherwise be a very complicated and costly structure. Further, this trackway 14 is structurally rigid and sufficient over a very great temperature range and has minimal thermal distortion. This trackway 14 also has superior thermal properties with respect to being advantageous for the heating of a food item 25 on the trackway 14. The required tooling for fabrication of this trackway 14 is also relatively economical and conventional. The trackway 14 can be consistently manufactured to close tolerances.

A still further important feature of this invention is the oven 10 formed by the base 11, cover 12, trackway 14, and reel 15 which oven 10 is easily assembled and then easily disassembled for cleaning and service.

The cover 12, as previously explained sits upon the base 11 and forms the oven chamber 13. The cover 12 may be grasped about the outside and lifted up off of the base 11, exposing the trackway 14 and reel 15 all around.

It is common knowledge that virtually every oven gets dirty within the baking chamber and that the interior of the oven must be cleaned along with all racks and other components in the oven chamber. This is also true with respect to the present oven 10, trackway 14, reel 15 and drive members 37.

Figure 2:
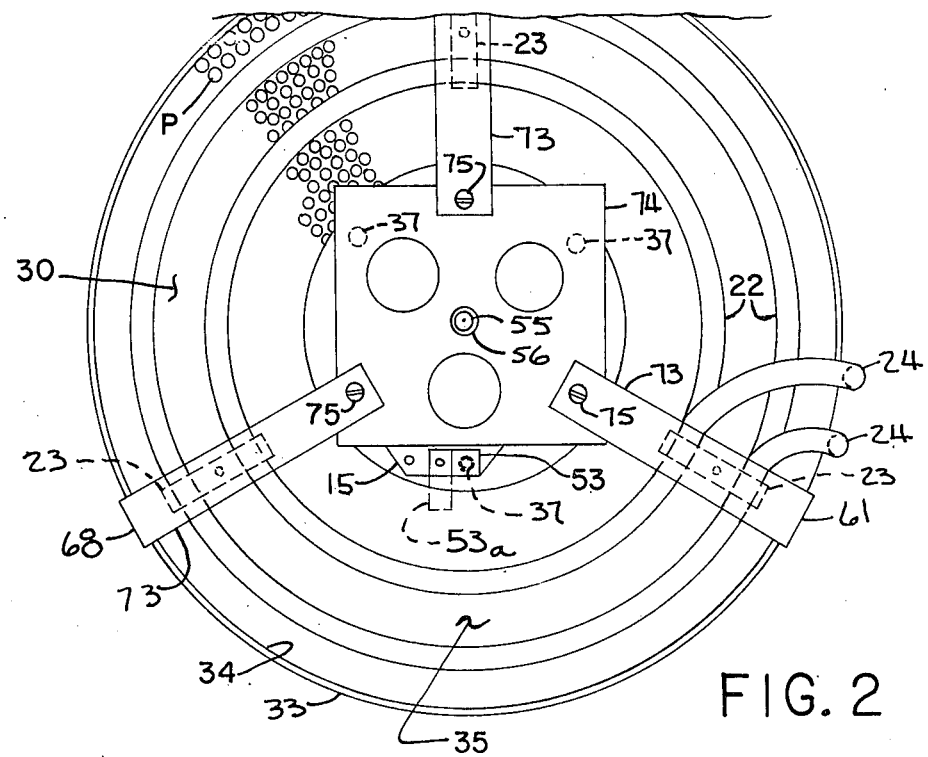
FIG. 2 is a top view of the structure of FIG. 1.

As shown in FIG. 2, the drive member retainer 53 is accessible when the cover 12 is removed. The retainer 53 may be turned to an alternate position 53a shown in dotted line and the drive member 37 may be removed upwardly and out of the reel 15. The drive rod may be then cleaned or replaced and reinstalled and the retainer 53 returned to the normal position. All of the drive rods 37 are removable and reinstallable when rotated, with the reel 15, to the position of access shown in FIG. 2.

The bearing plate 74, having an aperture therethrough forming the bearing 56, is removably fastened to the trackway 14 on separator top flanges 73 by the screws 75. When the bearing plate 74 is removed from the trackway 14, the entire reel 15 with its drive members 37 is either removable from or installable from the top of trackway 14 into and out of the open center section of the trackway 14. The spline 49 on the lower end of reel 15 is a coupling portion which is operatively complemental and connectable to the splined or keyed motor output shaft 20 which is a coupling portion that remains with the base 11. The output shaft 20 has a spline or keyed section similar to the section of reel spline 49. The reel 15 and output shaft 20 are freely and slideably connectable when the reel 15 is lowered upon the output shaft 20, for rotational driving of the reel 15 by the output shaft 20.

Referring to FIG. 1, there can be seen a thrust bearing 76 between the reel 15 and base 11. The thrust bearing 76 is of a low friction material such as Teflon or carbon and vertically supports the reel 15. The thrust bearing 76 is a washer, as shown on FIG. 6, which fits loosely about and is centered by the output shaft 20 which extends through insulated base 11 and projects upward into the oven chamber 13 as is illustrated in FIG. 1. The annular thrust surface 50 of th drive reel bears against the thrust bearing 76 which in turn bears against the base 11. This thrust bearing 76 is easily installed or removed when the reel 15 is removed.

The trackway 14 is removably secured to the base 11 by the plurality of separators 61,68,69 which also form upright structural support columns and are removably fastened to base 11 by the fasteners 72. When the fasteners 72 are unhooked, the trackway 14 lifts right off the base. The electric heating element 22 which is mounted on the top of the trackway 14, is removably fastened to the base 11 and is unfastenable from the base and co-removable from the base 11 together with trackway 14.

In use of the oven 10, the reel 15 and the trackway 14 may each be removed from the base 11 and may be washed in a dishwasher. Further, the particular configuration of assemblable and disassemblable construction reduces the manufacturing cost of the oven 10 and vastly improves servicability and replacement. The ability to be able to wash the reel 15 and trackway 14 in a dishwasher greatly reduces cleaning costs and also meets the requirements of sanitation codes to wich a commercial oven of this type is subject.

Although various minor modifications may be suggested by those versed in the art, it should be understood that we wish to embody within the scope of the patent warranted hereon, all such embodiments as reasonably and properly come within the scope of our contribution to the art.

We claim as our invention:

1. A rotary food heating oven comprising:
 a. an insulated base;
 b. an insulated cover removably sitting upon the base and forming together with the base a heatable oven chamber;
 c. an upright vertical axis annular trackway in the oven chamber for supporting food packages thereon, the trackway having an open center section and being secured to the base;
 d. a motor mounted in the base and having a drive coupling portion operatively accessible from within the trackway center section;
 e. a drive reel positioned within the trackway center section and having
  1. a lower end coupling portion operatively complemental and connectable to the motor coupling portion for connection of the reel to the motor for rotational movement of the reel within the trackway,
  2. a journal at its upper end, and
  3. means for engaging and advancing food packages around the trackway; and
 f. a bearing engaging the reel journal and aligning the reel with respect to the trackway, the bearing being removably secured to the trackway; and in which
  1. the cover is liftably removable from the base,
  2. the bearing is removable fromthe trackway when the cover is removed, and
  3. the reel is disconnectable from the motor and removable upwardly out of the trackway, and is also installable in the trackway and connectable to the motor, when the bearing is removed, for assembly and service of the oven.

2. An oven according to claim 1, in which the trackway is removably secured to the base and is removable therefrom when the cover is removed.

3. An oven according to claim 2, in which the trackway has a plurality of upright structural columns fixed to the periphery of the trackway, and each column has at its bottom, means for being fastened to the base and at its top, means for securement of the bearing.

4. An oven according to claim 2, in which the trackway has mounted thereto an electric heating element which is co-removable with the trackway from the base.

5. An oven according to claim 4, in which the electric heating element is removably fastened to the base.

6. An oven according to claim 1, in which the motor drive coupling portion is a vertical shaft having a keyed section, and the drive reel has a complementary keyed coupling portion which is freely, vertically slidable into driving engagement and out of driving engagement with the shaft.

7. An oven according to claim 6, in which the vertical shaft extends through the insulated base and projects upward into the chamber.

8. An oven according to claim 7, including a free floating low friction bearing centered about and positioned by the vertical shaft, and bearing against the base and supporting the drive reel above the base.

9. An oven according to claim 1, in which the food package advancing means comprises at least one elongate rod mounted in the drive reel, the rod being removable from the reel when the oven cover is removed from the base.

10. An oven according to claim 9, in which the reel includes a retainer at its upper end for retaining the elongate rod in the reel, the retainer being accessible and movable to an alternate non-retaining position when the oven cover is removed, for access to and removal of the elongate rod.

11. An oven according to claim 1, in which the bearing is formed by an aperture in a metal plate, the plate being removably retained to the top of the trackway by a plurality of fasteners.

12. A rotary oven for heating a circular food package comprising:
 a. a heatable oven chamber;
 b. a vertical axis annular trackway in the chamber for supporting a circular food package to be heated, the trackway having an inner circular edge, an outer circular edge formed by an upright cylindrical rim for retaining the package on the trackway with a portion of the package overhanging the inner circular edge, and a radial end for unloading a heated package from the trackway;
 c. a drive reel positioned inside of the trackway inner edge and having a drive rod for engaging the overhanging package portion and a spider having an edge positioned at a level lower than the level of the trackway end for partially supporting a package during unloading of the package from the trackway, the reel being rotatable about the axis of the trackway for advancing the circular food package around the trackway;
 d. an upright barrier effectively extending the rim past the trackway end a radial amount at least equal to the radius of a circular package;
 e. an outlet chute positioned below the trackway end, the spider support edge and the barrier, for directing a heated package out of the chamber; and
 f. a physical geometry formed jointly by and between the drive rod, trackway, spider and barrier, in which the drive rod is operative for pushing the circular package partially off the trackway to a
  1. first position in which the center of the package is past and off the trackway and the package is tilted downward off from the end of the trackway and is supported by the end and a point of contact between the package and the spider support edge, and to a
  2. second position advanced from the first position and in which the package is supported by a first point of contact between the package and the spider support edge, a second point of contact between the package and the trackway end and a third point of contact formed frictionally between the package and the barrier with he center of the package being within a triangle formed by the three contact points, the package being downwardly pivotable about a line between the first and second points of contact, and to a
  3. third position also having the said three points of contact and in which third position the moment of the package under the force of gravity about said line between the first and second points of contact is sufficient to overcome the friction of the third point of contact, for dropping the package off the trackway and spider and into the outlet chute.

13. An oven according to claim 12, in which the trackway radial end lies on a line which if extended would pass between the inner edge and the axis of the trackway.

14. An oven according to claim 12, in which the barrier is curved along a radius from the axis of the trackway.

15. An oven according to claim 12, in which the spider support edge is a straight edge which is generally parallel to the barrier when the reel is in a position which would place a circular package in the third position.

16. An oven according to claim 12, having a pair of such drive rods, the rods being radially spaced from each other for advancing a plurality of circular packages one after another around the trackway, and in which when the reel is in a position which would place a circular package in the third position, the rod preceding the circular package is positioned from the barrier a distance less than the diameter of the circular package.

17. A helical trackway for a rotary oven, comprising:
 a. a support track formed of an annular disc of flat perforated sheet metal, the perforations being open for convective and radiant passage of heat through the support track;
 b. a pair or radial ends on the support track, the ends facing each other and being formed by a physical split line extending from the inner circular edge to the outer circular edge of the annular disc;
 c. a separator attached to the support track at each end thereof and spacing apart the ends with one end relatively atop the other end forming the support track into a helical configuration;
 d. means for mounting of the support track in an oven cabinet.

18. A trackway according to claim 17, including a cylindrical rim around one of the circular edges of the support track, the rim being a bent flange of the same perforate sheet metal forming the support track.

19. A trackway according to claim 17, in which the separator has thereon a pair of parallel support straps extending generally perpendicular from the separator, each strap being under and attached to a respective one end of the support track fixing the ends of the support track parallel to each other.

20. A trackway according to claim 19, in which the support straps each have an L-shape and there is a cylindrical rim around one of the circular edges of the support track, one leg of each L-strap being welded to the bottom side of the support track, the other leg being welded between and to the separator and the circular rim.

21. A trackway according to claim 17, in which the support track extends beyond one revolutionary level, the track being formed of a plurality of such annular discs positioned one above the other and radial end to radial end against one another, with each level being spaced from the adjacent level and attached to the separator forming a continual multilevel helical support track.

22. A trackway according to claim 21, in which the separator has thereon a plurality of parallel support straps extending generally perpendicular from the separator, each strap being under and attached to a respective level of the support track, said straps fixing the levels of the support track parallel to each other.

23. A trackway according to claim 21, including second and third separators attached to the support track and spaced radially around the support track from the first separator and from each other.

24. A trackway according to claim 23, in which each separator has means for mounting of the support track in an oven cabinet.

25. A trackway according to claim 24, in which each mounting means comprises a flange forming a fastener aperture underneath the support track.

26. A trackway according to claim 23, in which each separator has thereon a plurality of parallel support straps extending generally perpendicular from the separator, each separator having one strap attached to a respective one level of the support track.

27. A trackway according to claim 17, in which the open perforations form at least forty percent of the area of the annular disc.

28. A trackway according to claim 27, in which the open perforations form a percentage of the area of the annular disc in the range of forty to sixty percent.

29. A rotary oven drive reel for imparting epicyclic motion to round food packages in a food oven having an annular trackway for the packages, comprising:
  a. a pair of spiders spaced from each other and rigidly connected together with a drive shaft, the spiders and drive shaft being co-rotatable about a common center;
  b. means in the connected spiders and drive shaft for driving the spiders co-rotatably about their center;
  c. a bearing in each spider, each bearing being spaced radially outward from the center of the respective spider, both bearings being in axial alignment with one another;
  d. an elongate round drive rod mounted in and between the spiders for engaging and advancing food packages as the reel is rotated, the drive rod having a pair of journals, each journal being in engagement with a respective bearing, and the drive rod being free to rotate about its own axis; and
  e. means for axially retaining the drive rod in the bearings.

30. A reel according to claim 29, in which the driving means includes an internal spline in the drive shaft and the splined end of the drive shaft has an annular thrust surface for supporting the reel in a vertical position.

31. A reel according to claim 29, in which the drive rod is coated with a low friction coating.

32. A reel according to claim 31, in which the low friction coating covers the length of the drive rod and forms the surface of each journal and also a low friction surface for engaging food packages.

33. A reel according to claim 29, in which the reel is adapted to stand vertically, and the drive rod has an annular thrust bearing which engages a spider and supports the drive rod in the reel.

34. A reel according to claim 33, in which the rod has a top end having an expanded shoulder for precluding dropping of the rod through the bearing in the top spider.

35. A reel according to claim 33, in which the retaining means is mounted to a spider for retaining the drive rod in the reel in a direction opposite to the direction of support from the rod thrust bearing, and the retaining means is movable to an alternate position enabling removal of the drive rod from the reel.

36. A rotary oven for heating a circular food package, comprising:
  a. heatable oven chamber;
  b. a vertical axis annular trackway in the chamber and having a generally horizontal annular support surface for supporting thereon a circular food package, an inner circular edge on the support surface, an outer circular edge on the support surface, and a cylindrical rim extending upright from one of the support surface circular edges for retaining the circular food package upon the trackway with a portion of the package being on the support surface and a portion of the package radially overhanging off of the support surface;
  c. a drive reel mounted coaxially with the trackway and being rotatably drivable about the axis of the trackway; and
  d. a graphite surfaced drive rod mounted in the reel and presenting a low friction graphite surface generally parallel to the trackway axis, said graphite surfaced drive rod being spaced radially outward from the trackway axis and being revolvable through a circular path adjacent to the trackway for engaging the overhanging portion of a circular food package on the trackway support surface and biasing such package into frictional engagement against the trackway rim, for effecting an epicyclic motion in the package while simultaneously advancing the package around the trackway.

37. An oven according to claim 36, in which said graphite surfaced drive rod is rotatable in said reel and about itself, for constantly changing a point of contact of the graphite surface against the food package during rotation of the reel and advancing of a package around the trackway.

38. An oven according to claim 37, in which the reel has therein a bearing rotatably mounting the graphite surfaced rod in the reel, and in which the rod presents a low friction graphite surface to both of the bearing and a food package on the trackway.

39. A rotary oven for heating a circular food package, comprising:
  a. an oven chamber having therein means for heating of the chamber;
  b. an annular trackway mounted and stationarily fixed within the chamber, said trackway having
    (1) an annular support surface formed of a flat sheet of perforated sheet metal for supporting food packages thereon with the perforations being open for convective and radiant passage of heat through the surface, and
    (2) a cylindrical rim fixed on and to the outer periphery of the annular support suface, said rim extending upright from and being generaly perpendicular to the annular support surface and having an inner friction surface facing toward the annular support surface for engaging and retaining a food package upon the annular support surface;

c. means for advancing a circular food package around the annular trackway for heating of the package, said advancing means including means for biasing such circular food package frictionally against said outer peripherial rim so that said rim will rotate said package in an epicyclic motion over said perforated sheet metal annular support surface; and d. means providing access to the oven chamber for insertion and removal of a food package on the trackway.

40. An oven according to claim 29, in which the rim is an upwardly bent perforated flange of the same perforated sheet metal which forms the annular support surface.

41. An oven according to claim 29, in which the rim has a perforated edge, said perforated edge being engagable against a circular food package for rotating said food package as the package is advanced past and in engagement with said perforated edge.

* * * * *